US007789741B1

(12) United States Patent
Fields et al.

(10) Patent No.: US 7,789,741 B1
(45) Date of Patent: Sep. 7, 2010

(54) SQUAD VS. SQUAD VIDEO GAME

(75) Inventors: Timothy V. Fields, Austin, TX (US);
James R. J. York, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 1695 days.

(21) Appl. No.: 10/377,385

(22) Filed: Feb. 28, 2003

(51) Int. Cl.
*A63F 9/24* (2006.01)

(52) U.S. Cl. .......................................... 463/2
(58) Field of Classification Search .................. 463/2
See application file for complete search history.

(56) References Cited

U.S. PATENT DOCUMENTS

| 4,091,234 | A |   | 5/1978  | Bristow          |        |
|-----------|---|---|---------|------------------|--------|
| 4,124,787 | A |   | 11/1978 | Aamoth et al.    |        |
| 4,275,611 | A |   | 6/1981  | Asher            |        |
| 4,349,708 | A |   | 9/1982  | Asher            |        |
| 4,687,200 | A |   | 8/1987  | Shirai           |        |
| 5,411,270 | A |   | 5/1995  | Naka et al.      |        |
| RE35,314  | E |   | 8/1996  | Logg             |        |
| 5,691,898 | A | * | 11/1997 | Rosenberg et al. | 700/85 |
| 5,724,558 | A |   | 3/1998  | Svancarek et al. |        |
| 5,824,933 | A |   | 10/1998 | Gabriel          |        |
| 6,371,849 | B1|   | 4/2002  | Togami           |        |
| 6,394,897 | B1|   | 5/2002  | Togami           |        |
| 6,428,411 | B1|   | 8/2002  | Togami           |        |
| 6,468,160 | B2|   | 10/2002 | Eliott           |        |
| 6,509,896 | B1|   | 1/2003  | Saikawa et al.   |        |
| 6,712,704 | B2|   | 3/2004  | Eliott           |        |
| 6,769,989 | B2|   | 8/2004  | Smith et al.     |        |
| 6,951,516 | B1|   | 10/2005 | Eguchi et al.    |        |
| 2002/0065119 | A1 | | 5/2002 | Togami          |        |
| 2002/0103031 | A1 | | 8/2002 | Neveu et al.    |        |
| 2003/0045360 | A1 | | 3/2003 | Hora            |        |
| 2004/0162137 | A1 | | 8/2004 | Eliott          |        |
| 2004/0166914 | A1 | | 8/2004 | Ishihata et al. |        |
| 2006/0178179 | A1 | | 8/2006 | Neveu et al.    |        |

OTHER PUBLICATIONS

Diablo II Wikipedia Entry, http://en.wikipedia.org/w/index.php?title=Diablo_II.*
Boulding, Conflict: Desert Storm, Aug. 15, 2002, http://xbox.ign.com/articles/354/354848p1.html.*
Newman, Conflict: Desert Storm, Jul. 26, 2002, http://www.entdepot.com/xbox/conflictdesertstorm/preview.php.*
Klepeck, Conflict Desert Storm, Aug. 14, 2002, http://www.gaming-age.com/cgi-bin/previews/preview.pl?sys=xbox&game=conflict.*

(Continued)

*Primary Examiner*—Corbett B Coburn
(74) *Attorney, Agent, or Firm*—Lee & Hayes, PLLC

(57) ABSTRACT

A squad versus squad shooter video game receives input from one or more players via their respective use of controllers in communication with one or more console-based video game systems. The input from each controller is interpreted as a command to a squad in a competition against one or more other squads that are respectively commanded by one or more players via their respective use of controllers. Each squad includes a plurality of characters. Each player is assigned to one of the squads. Actions of each character in the video game are a function of commands given to that character by one of the players. Players can join or exit their assigned squad during game play.

36 Claims, 7 Drawing Sheets

OTHER PUBLICATIONS

Wikipedia Article on Uniform Serial Bus, http://en.wikipedia.org/wiki/Universal_Serial_Bus.*
IGN Review of "Conflict: Desert Storm," cube.ign.com/objects/480/480753.html, downloaded on Mar. 19, 2006.
Screenshots of "Conflict: Desert Strom" from cubemedia.ign.com/cube/image, dfictdtorm.jpg to~3.jpg, downloaded Mar. 19, 2006.
SCi, Ltd, news releases of "Conflict Desert Strom," indication public preview on Nov. 16 and 17, 2001, in Cannes, France, games.sci.co.uk/games/basic.asp?version_id=23, downloaded Mar. 19, 2006.
Xbox Version User Manual, "Conflict: Desert Strom" 2002 Sci. Ltd. Release date of the game establiched as Sep. 30, 2002.
Take2 Interactive review of "Conflict: Desert Stom" www.take2games.com/index.php?p=games&platform=xbox&title=cds, downloaded on Mar. 19, 2006.
Team Xbox preview of "Conflict: Desert Storm" Xbox version, indication release date of Sep. 30, 2002, before filing date of Dec. 2, 2002, games.teamxbox.com/xbox/34/Conflict-Desert-Storm/, downloaded on Mar. 19, 2006.
"Close Quarters Battle", pp. 28.
"Conflict: Desert Storm", pp. 1-20.
"D-pad", retrieved on Nov. 16, 2006, at <<http://en.wikipedia.org/wiki/D-pad>>, Wikimedia Foundation, Inc., pp. 1-2.
"Military Organization", retrieved on Nov. 16, 2006, at <<http://en.wikipedia.org/wiki/Military_unit>>, Wikimedia Foundation, Inc. pp. 1-3.
"Operations", retrieved on Nov. 16, 2006, at <<http://www.globalsecurity.org/military/library/policy/army/fm/7-8/change1.htm>>, GlobalSecurity.org, 2000-2006, pp. 1-135.
"SWAT 3: Close Quarters Battle", retrieved on Apr. 27, 2007, at <<http://pc.ign.com/objects/011/011663.html>>, IGN Entertainment, Inc., pp. 13.
Wessel, Craig "Talon", "Mobile Forces (PC)", May 20, 2002, http://ww.gamespy.com/e32002/pc/mf/, 2 pages.
Wojnarowica, Jakub "WarSpite", "Quake 3 Team Arena Demo," Nov. 24, 2000, http://firingsquad.gamers.com/games.teamarenademo/default.asp, 2 pages.
Eidos, "Something is Wrong in the Garden of Eden!", Feb. 22, 2003, http://www.cdaccess.com/html/pc/projeden.htm, 3 pages.

* cited by examiner

SQUAD VS. SQUAD VIDEO GAME

RELATED APPLICATIONS

This patent is related to U.S. patent application Ser. No. 10/307,628, filed on Dec. 2, 2002, titled "DYNAMIC JOIN/EXIT OF PLAYERS DURING PLAY OF CONSOLE-BASED VIDEO GAME" (herein after, the "Join/Exit Patent"), which is incorporated herein by reference.

This patent is related to U.S. patent application Ser. No. 10/269,500, filed on Oct. 11, 2002, titled "SQUAD COMMAND INTERFACE FOR CONSOLE-BASED VIDEO GAME" (herein after, the "Interface Patent"), which is incorporated herein by reference.

TECHNICAL FIELD

The invention relates to video games, and more particularly, to a video game that enables a player to command a squad of characters in a shooter video game.

BACKGROUND

One genre of video games is known as "shooter" games, in which players engage in forms of combat using various weapons. Within the shooter genre, the game may be developed in a first person context, in which the player views the scenes through the eyes of the shooter. Alternatively, the game may be architected in a third person context, where the player views the scenes from a camera viewpoint removed from each character.

Some shooter games enable the player to control a squad of characters, rather than just a single character. The player can give an order to a selected character of the squad, and that character carries out the orders without direct intervention from the player. Representative squad-based games include Project Eden, which is developed by Core Design Ltd. and published by Eidos Interactive for Sony's Playstation® game system, and X-Squad, which is developed and published by Electronic Arts for Sony's Playstation® game console.

In squad-based, third-person shooter video games for console-based gaming systems, it is known to support a gaming environment in which a first squad of characters engages in combat with a second squad of characters. Typically, one or more players control the actions of the characters in the first squad while artificial intelligence (AI) controls the actions of the characters in the second squad. This is not conducive, however, to situations where the one or more players controlling the first squad wish to test their skills against that of other players. For instance, one player may wish to challenge another player, "player-to-player", in their respective commands of a squad of characters. After the game starts, the starting two players may wish to be assisted in their command of the respectively assigned squads by one or more additional players who will respectively join those players midway through the game. The competition can then be characterized as a team of players commanding the first squad in combat against a team of players commanding the second squad. Then, at a later point, one player may wish to leave the game before it is over. Rather than providing for this challenge, conventional squad-based, third-person shooter video games merely match a player controlled squad against AI—not against other players. This player versus machine competition is not satisfying to some players who prefer interpersonal competition.

Accordingly, there is a need for an improved squad-based, third-person shooter video game for console-based gaming systems in which one or more players can challenge other players in their command of a respective squad of characters.

SUMMARY

A video game system plays a squad-on-squad shooter video game that allows one or more players commanding one squad to engage their squad in combat against another squad that is being commanded by one or more other players. Commands are received for each of a plurality of characters on each squad from a respective controller used by a player for making input to the video game console system. Each player is assigned and can give commands to the plurality of characters on one of the squads. Each command is interpreted as an action to be taken by one of the characters on the squad to which the respective player is assigned. A command can be a direct command given by an on-going input from a player by use of a respective controller to control how the directly commanded character moves, what that character sees, and how that character acts. A command can also be an indirect command that is given to one character that is not being directly commanded by another player. The indirect command is given by a one-time input from a player by use of a respective controller. Artificial intelligence is used to interpret the indirect command so as to perform functions consistent with the one-time input, such as to control where the indirectly commanded character is to move and how the character is to function in combat. Players can join or exit an assigned squad during game play.

BRIEF DESCRIPTION OF THE DRAWINGS

In FIG. 4, the exemplary screen display is divided into two viewing panels, one for each of the two players.

DETAILED DESCRIPTION

Figure 1:
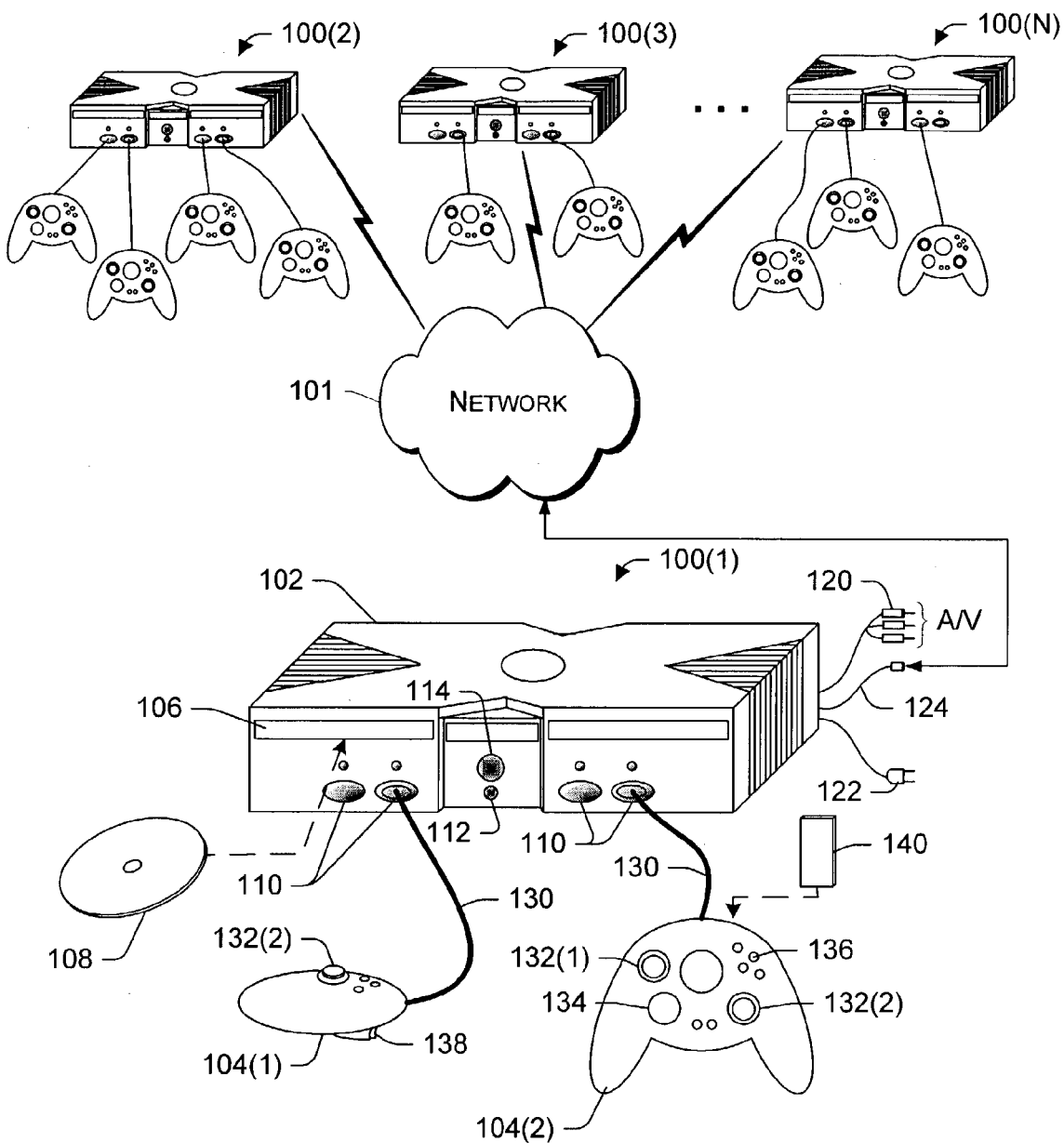
FIG. 1 illustrates a network of gaming systems, where each gaming system has one or more controllers.

The following disclosure describes a squad versus squad shooter video game that allows one or more players to compete against one or more other players in their respective commanding of a squad of characters. For discussion purposes, the squad versus squad shooter video game is described in the context of being played on one or more console-based gaming systems that respectively support a limited number of game controllers and players. Such consoles can be implemented as a dedicated game console, as set-top boxes, or other types of home entertainment systems.

In the described implementation, the squad versus squad shooter video game can be played on one standalone gaming system, or on two or more gaming systems that are in communication with one another. Players control squads of characters in head-to-head combat. Each squad consists of multiple characters, and every player is assigned to one of the squads so that each squad is controlled by one or more players. Any action taken by any character during game play is a function of a command given to that character by one of the players that has been assigned to the character's squad.

During game play, a new player is allowed to join in the command of an existing squad or to form a new squad to engage in combat against the other squads. The new player can join by placing another console-based video game system in communication with those console-based video game systems that are currently playing the video game. Alternatively, the new player can also join by attaching a game controller to an available slot of a console-based video game system that is currently playing the video game. When the new player takes either of the foregoing actions, a join menu offers an option to join in the command of an existing squad or to form and control a new squad.

When the joining player chooses the option from the join menu to join an existing squad, the new player is granted control over a squad member (e.g., character) not currently being controlled by another player. When the new player shares a console-based video game system with other players, the screen display is split to provide a viewing panel for each player. When the new player connects a new console-based video game system to the other console-based video game systems, the screen display is not split but rather provides a single viewing panel for the new player. Each viewing panel corresponds to a player and depicts the game action from the perspective of that player's squad member over which control has been granted.

When the joining player chooses the option from the join menu to form a new squad of characters, the new player is associated with a character on a new squad over which control by the new player has been granted. The new player's viewing panel depicts the battle perspective taken from the character on the new squad over which control by the new player has been granted. The new squad will allow for up to three or more players, where multiple players can work together in controlling the squad of characters in competition with one or more other players who are controlling one or more squads of enemy characters.

Given the foregoing, the video game allows players to dynamically join or leave a game in progress without having to save and restart the game. When one of the players leaves the game by disconnecting the player's controller from one of the gaming systems that is playing the video game, the screen display is updated to remove the viewing panel for the exiting player. When a player controls an entire squad and that player is the only player that is using a gaming system, the player can leave the game by disconnecting the gaming system from communicating with the other gaming systems that are also playing the video game. In this case no change is made to the remaining player's viewing panels. Rather, an exit menu can be displayed to the remaining one or more players that allows the interactive selection of the options to extinguish the squad of the exiting player or to permit the control of that exiting player's squad to continue solely by artificial intelligence. The process of joining and leaving is dynamic, allowing continuous and uninterrupted play as players come and go.

Console-Based Gaming System

FIG. 1 shows a network of exemplary console-based gaming systems 100(1), 100(2), . . . , 100(N) interconnected via a network 101. The network 101 may be implemented as a local area network (e.g., Ethernet cross-over cable, Ethernet hub, IEEE 1394 bus, universal serial bus) or as a wide area network (e.g., Internet). Each gaming system (referenced generally throughout as number "100") includes a game console 102 and up to four controllers, as represented by two controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may be further equipped with internal or externally added network capabilities, as represented by the cable or modem connector 124 to facilitate access to the network 101.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:

1. Game titles played from CD and DVD discs, from the hard disk drive, or from an online source.
2. Digital music played from a CD in the portable media drive 106, from a compressed file on the hard disk drive (e.g., Windows Media Audio (WMA) format), or from online streaming sources.
3. Digital audio/video played from a DVD disc in the portable media drive 106, from a file on the hard disk drive (e.g., Windows Media Video (WMV) format), or from online streaming sources.

Figure 2:
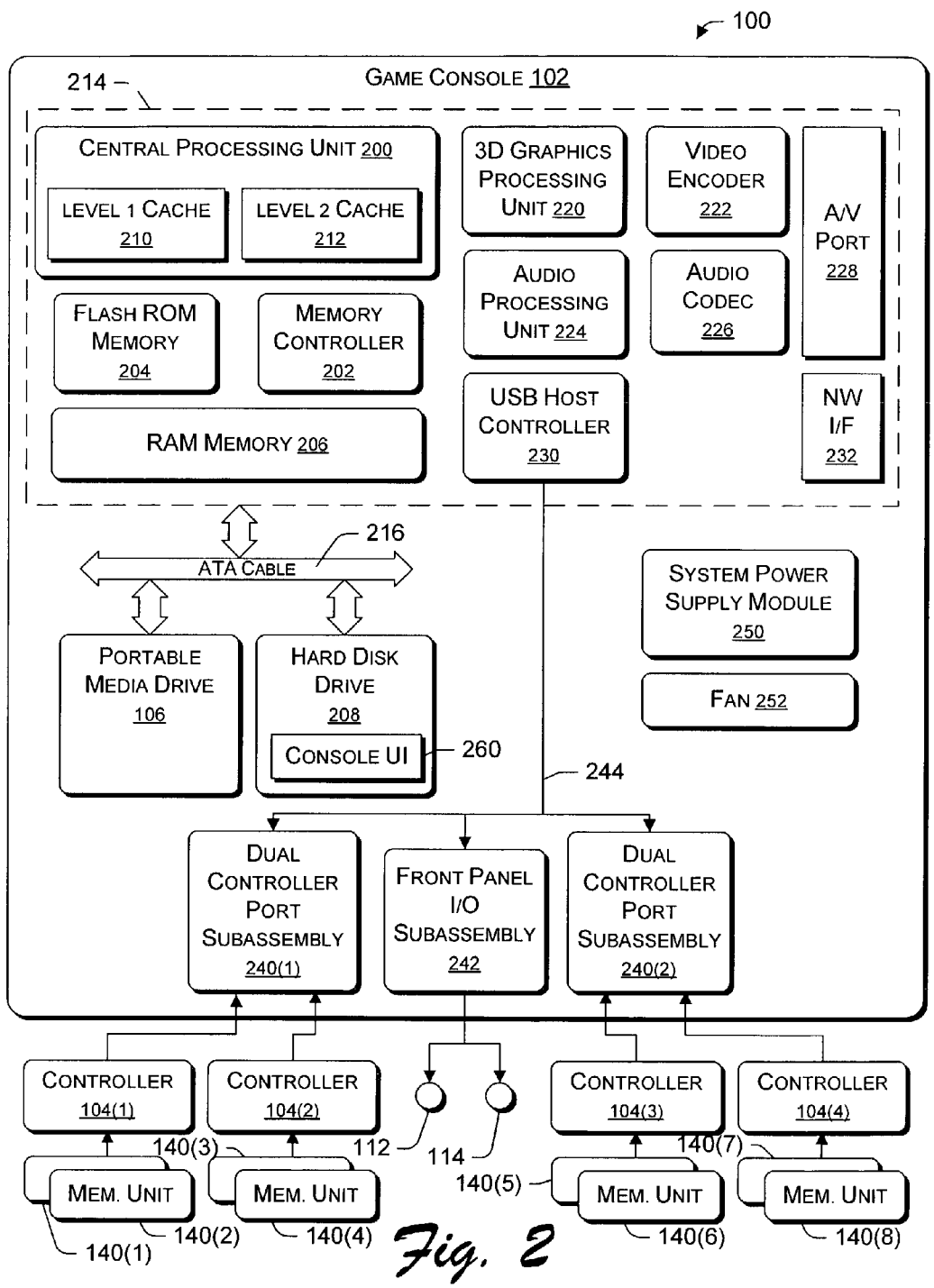
FIG. 2 is a block diagram of a gaming system of FIG. 1 that is capable of supporting a squad versus squad shooter video game.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community by using of a local area network or the Internet. In another implementation, the gaming system 100 can be used in a larger gaming community by directly connecting the gaming system 100 to a like gaming system. In this other implementation, rather than using of a local area network or the Internet, the direct connection can be made by an electrical cable to ports on the respective gaming systems (not shown).

Video games, including the squad versus squad, first and/or third-person, shooter video game described herein, may be stored on various storage media for play on the game console. For instance, a video game may be stored on the portable storage disc 108, which is read by drive 106. Alternatively, the video game may be stored in hard disk drive 208, being transferred from a portable storage medium or downloaded from a network. During play, portions of the game are temporarily loaded into RAM memory 206, caches 210 and 212, and executed by the CPU 200. One particular video game of the shooter genre is described next.

Prior to describing the video game, however, it should be noted that the video game may be played on other console platforms besides the illustrated dedicated gaming system. Examples of other console platforms include set top boxes, digital video recorders, and other home entertainment units configured to support video games and connectable/disconnectable game controllers.

Squad Versus Squad Shooter Video Game

A squad versus squad video game allows one or more players to challenge one or more other players in their respect commands of a squad to which they are assigned. Each of the squads is in a competition against all other squads. Each squad includes a plurality of characters and is commanded by one or more players via their respective use of controllers. Each controller is connected to a console-based video game system that is playing the video game. Each player is assigned to only one squad, although multiple players can be assigned to the same squad. Each squad has at least one player assigned to it. Actions by characters during game play are a function of a command given to that character by one of the players.

Each player directly commands only one character on their assigned squad at a time. Each player sees a display of a first or third person view corresponding to their directly commanded character. Input can be provided by each player via their respective controller so as to indirectly command another character that is not being directly commanded by another player. Artificial intelligence (AI) controls the actions of each indirectly commanded character as a function of on-going input from the corresponding player. The player provides the on-going input using one of the controllers so as to control where the directly commanded character moves, what that character sees, and how that character acts. A direct command can be a command to move the directly commanded character, a command to aim and/or to fire a weapon, a command to take an aggressive action against another character on another squad, or a combination of the foregoing.

Each player can also give indirect commands to any character of their assigned squad that is not being directly commanded by another player. An indirect command is given by the respective player by a one-time input using the player's controller. This one-time input is interpreted by the AI to perform functions consistent with the one-time input, including where to move the indirectly commanded character and how the character is to function in combat. As such, each player is constantly directly controlling one character on the assigned squad while also having the ability to give occasional indirect commands, that do not require continued input, to any other character on the player's assigned squad that is not being directly controlled by another player.

The video game can be played by two players assigned to different squads such that the characters that each player directly commands engage in combat one with another (e.g., man to man mode). As such, by providing input via their respective controller, each player will see a view panel that includes the directly commanded character of the other player. Of course, each player can also provide input via their respective controller such that their directly commanded character on their assigned squad engages in combat with one or more characters of the other squad that are not being directly commanded and during which the player can see those characters of the other squad that are not being directly commanded (e.g., man against artificial intelligence mode).

As set forth above, the squad versus squad shooter video game supports play by two or more players. The video game further allows one or more additional players to dynamically join a game that is in progress without having to save and restart the game. When additional players join, the players can either work together in controlling different characters on the same squad, or the joining players can form one or more new squads. Each new squad will engage in combat against all other squads. When new players share a gaming system, the screen is further divided to allow each player to view the combat from their character's perspective. Players can also dynamically leave a game without causing a disruption. The dynamic transition of adding and removing players is described below.

In order to allow a player to join other game players playing the video game on a gaming system, the gaming system can detect a join condition indicating that a new player would like to join in playing the squad versus squad video game. Upon detecting the join condition, it can be determined if the new player is to form a new squad or if the player is to join an existing squad. This determination can be made by providing a screen display presenting a join menu to indicate a new player is joining the game. Game play can then be facilitated by the new player and the other players with the respective squads that they command.

A join condition can be generated as a result of the new player connecting a game controller to a gaming system running the game title. A join condition can also be generated as result of a gaming system establishing communications with a like gaming system, where both gaming systems are running the game title. The communication can be established by an electrical cable connected to each gaming system or by a network connection to a network with which each gaming system is in communication, as represented by network 101 in FIG. 1. By way of example, and in reference to FIGS. 1-2, the foregoing connections between game systems running the game title can be made using network interface 232 and/or cable or modem connector 124 to facilitate access to a network, such as a local area network or the Internet.

When it is determined that the new player is to dynamically join an existing squad during game play, an association of a first character is made from one squad with an existing player and another association is made of a second character of the one squad with the new player. As such, each player controls a different character of the squad. When it is determined that the new player is to form a new squad during game play, an assignment of the new squad of characters is made to the new player.

The video game further allows one or more additional players to dynamically exit a game that is in progress without having to save and restart the game. In order to allow a player to exit playing the video game on a gaming system, the gaming system can detect an exit condition indicating that that one of the players is quitting play of the game title. Upon detecting the exit condition, the existence of a first condition or a second condition can be determined. The first condition occurs where the exiting player is the only player commanding the squad to which the exiting player is assigned. The second condition occurs when other players are assigned to command the same squad as the exiting player. In the case of the first condition, an exit menu can be displayed. One or more of the remaining players can use the exit menu to choose whether they want the assigned squad to be extinguished from the game play, to be controlled by a remaining player that is currently sharing command of a remaining squad, or to be controlled by artificial intelligence (AI) rather than by any remaining player. In the case of the second condition, where the exiting player's squad is to be controlled by a remaining player, an association can be made between the character with which the exiting player was associated and the remaining player being assigned to the exiting player's squad. The viewing panel of the exiting player can be eliminated.

The exit condition can be generated as a result of the exiting player disconnecting a game controller from a gaming system running the game title. The exit condition can also be generated as a result of the disconnection of a gaming system running the game title from another gaming system running the game title, either by a direct cable connection or by disconnection from a network with which the gaming systems are in communication.

Single Player Squad Command Mode

Figure 3:
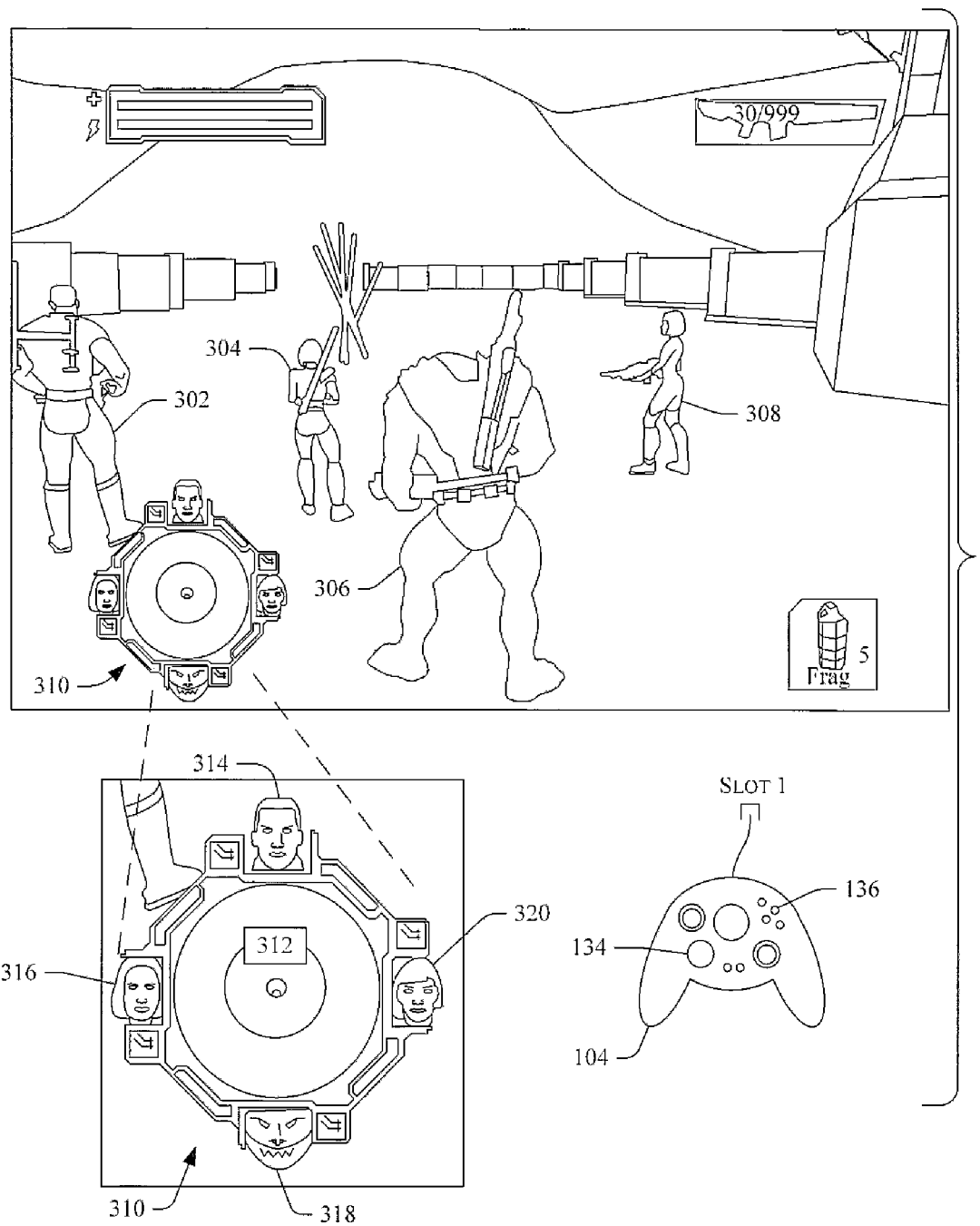
FIG. 3 illustrates an exemplary screen display that is depicted during play of the squad versus squad shooter video game over a network connection, where each player controls a squad from his/her own gaming system. The exemplary screen display represents what a player might see when viewing the combat from his/her squad's perspective via an undivided viewing panel.

FIG. 3 shows an exemplary screen display 300 from the squad versus squad shooter video game in a single player squad command mode. In the single player squad command mode, one player controls one squad. In the example given with respect to FIG. 3, a single player is playing one gaming system and controls a first squad. Although not shown in FIG. 3, another player is playing the video game on a different gaming system, which is connected to communicate with the first player's gaming system. With reference to FIG. 1, for example, the first player is playing on gaming system 100(1) while the second player is playing on gaming system 100(2). The second player is commanding a different, second squad that is engaged in combat with the first squad. Each player uses a user interface for the squad versus squad shooter video game. The user interface allows a player to issue commands to one or more squad members and hence, is referred to as a squad command interface. The squad command interface maps character selection and command selection to actuators on a handheld game controller to facilitate efficient and intuitive operation. Through the interface, a player can simultaneously issue the same command to multiple squad characters. Additional details with respect to the user interface, the squad command interface, and each player's interaction therewith, are disclosed in the Interface Patent which has been incorporated herein by reference.

The single player is represented in FIG. 3 by one controller 104 connected to slot 1 in the face of the game console. The illustrated scene is from a video game title, Brute Force, which is developed for Microsoft's Xbox® gaming system. A squad of four characters is illustrated, including a first character 302 named "Tex", a second character 304 named "Hawk", a third character 306 named "Brutus", and a fourth character 308 named "Flint". As is common in third-person games, the player's viewpoint is taken at a position removed from the characters. In this scene, the player viewpoint is manifest from a camera perspective positioned behind and proximal to the Brutus character 306. As mentioned above, the game console is playing the video game with only one controller attached. As such, the player's viewpoint is depicted in full screen. The second player playing on the other gaming system would likewise view another full screen display showing the battle from his/her squad's perspective.

During squad versus squad game play, the depicted squad of characters engages in combat against one or more other squads of characters. Although not shown in this scene, the opposing squad would be shown in the screen display 300 when the squads are in close proximity or directly fighting one another. The other squads may employ the same four characters (illustrated in different colors to distinguish them on the battlefield) or different types of characters with different abilities. The various squads may even have different numbers of characters, although for discussion purposes, each squad is comprised of four main characters.

When the player's viewpoint is depicted in full screen, a squad status display 310 is positioned in the lower left-hand portion of the scene. The squad status display 310 is persistently visible during combat action and is located in a non-focal region of the screen, such as the lower left-hand corner as shown. The status display 310 is integrated with a radar display 312, which indicates where various characters of the squad are located relative to one another. In the illustrated example, the squad status display 310 encircles the radar display 312 and depicts profile images of the four squad characters. The profiles include a first character profile 314 for the Tex character 302, a second character profile 316 for the Hawk character 304, a third character profile 318 for the Brutus character 306, and a fourth character profile 320 for the Flint character 308. The four character profiles 314-320 on the squad status display 310 are mapped visually and spatially to a first actuator (e.g., D-pad 134) on the controller 104.

The squad status display 310 indicates which character is currently selected for receiving direct commands by the player, where as the other characters are controlled by the AI. Here, the Brutus character 306 has been selected by the player as represented by a highlighted boundary around the Brutus character profile 318. Only one character can be directly commanded by a player. When the Brutus character is selected by the player to be directly controlled or commanded, the camera viewpoint resides proximal to, and behind, the Brutus character 306 as shown in screen display 300.

The player can select a different character to directly command, and thereby change the camera viewpoint to that character's perspective, by actuating the D-pad 134 at distinct pad coordinates (i.e., north, west, south, east) that correspond to the four character profiles of Tex 314, Hawk 316, Brutus 318, and Flint 320. A single tap of the D-pad 134 allows the player to select a new character to be directly commanded which simultaneously changes the camera viewpoint in the scene to that of the directly controlled character (e.g., a first-person view or a third-person 'over-the-shoulder' view). It is noted that the game may be configured to support selection of the characters using other actuators on the controller. For instance, in one implementation, a player can depress a button or trigger to cycle through the character profiles of the squad status display 310 in clockwise or counter-clockwise rotation.

When a character is selected to be directly controlled by a player, the player has on-going control of where that character moves, what that character sees, and how that character acts by use a controller. The other characters of the squad that have not been selected by other players can receive one-time commands (indirect commands) from the player, such as where to move and how to function in combat. AI is built into the video game to control the other non-selected characters of the squad as a function of their respective one-time commands. As such, the AI directly commands the remaining non-selected characters to perform functions consistent with the indirect one-time commands given by the players. Moreover, the AI indirectly commands the selected characters to perform functions consistent with the direct on-going commands instructed by the players.

The player can issue commands to one or more characters on the squad. When the player wishes to issue a new command, the player invokes a command change user interface (not shown) that presents various command options. In one implementation, the player presses and holds the D-pad 134 to concurrently select a character and invoke the command change UI. Once invoked, the command change UI allows the player to select one or more characters and presents possible commands that may be issued to the selected character(s). Example command options include "stand ground", "fire at will", "move to" a specific area, or "defense mode". The options are oriented on the screen to map visually and spatially to actuators on the controller 104 (e.g., surface buttons 136) so that one actuation enables a player to issue a common order to the one or more selected characters.

Multiple Player Squad Command Mode

In addition to single player squad command mode, the squad versus squad shooter video game supports a multiple player squad command mode. In the multiple player squad command mode, more than one player controls the same squad. The players use controllers in communication with the same gaming system to control different members of the same squad, and work cooperatively to carry out squad missions against other squads controlled by other players.

During game play, players can dynamically join or leave a game in progress without having to save and restart the game. Additional details with respect to the dynamic joining and leaving of a game in progress are disclosed in the Join/Exit Patent which has been incorporated herein by reference.

In the standalone setting, a single gaming system is used by all players to play the squad versus squad shooter video game. For example, game console 102 of FIG. 1 can be equipped with four controller slots to support up to four controllers (and hence, four players). A new player can join one or more existing players in a game that is in progress by simply connecting a controller to an available slot. The video game detects when another player has joined the game by continually polling the hardware for a connection of a controller 104 to an available slot. When a connection is detected, the video game optionally presents a join menu indicating that a new player has joined the game.

Figure 4:
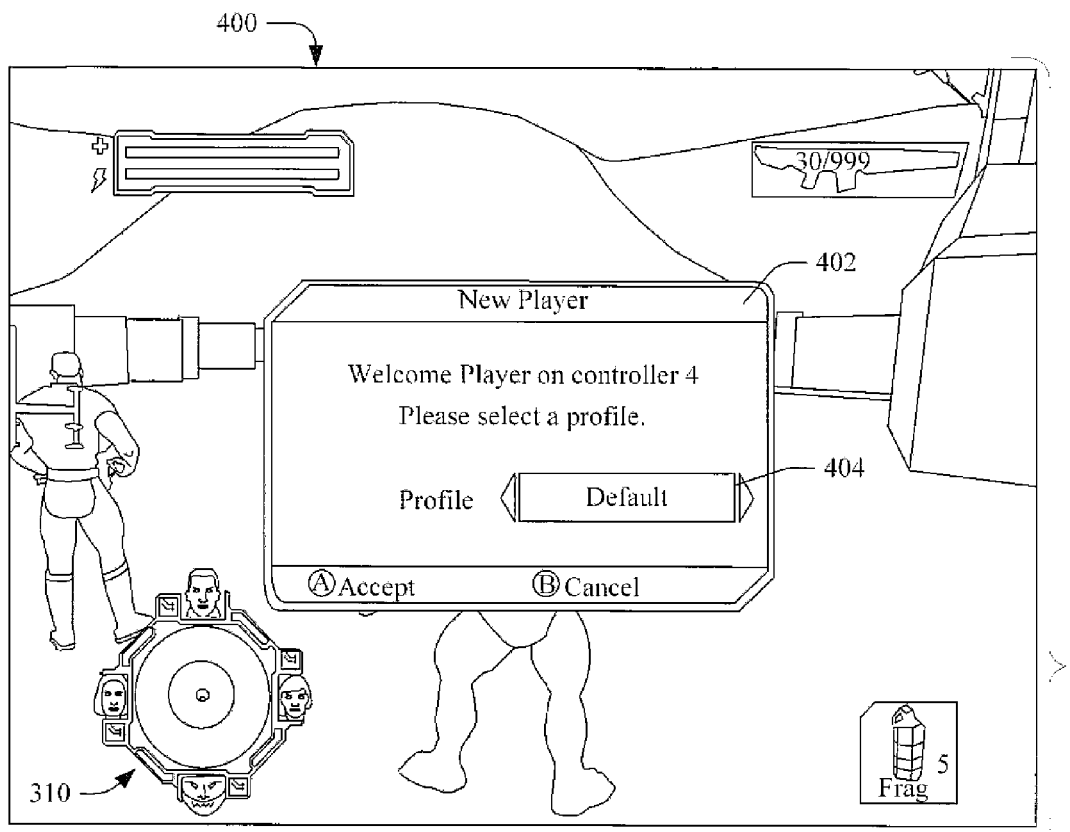
FIG. 4 illustrates an exemplary screen display when two players are playing the squad versus squad shooter video game against each other on the same gaming system.
Figure 4:
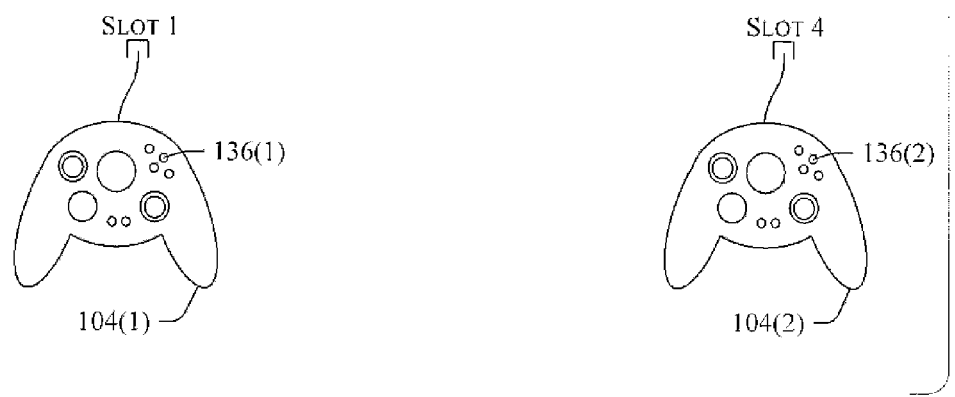

FIG. 4 shows a screen display 400 that is depicted when a second player joins the first player by plugging in a controller 104(2) to slot 4 on the face of the game console. A join menu 402 pops up on the screen and overlays the combat action as seen from the character perspective of the first player. The join menu 402 includes a welcoming statement and offers the new player a choice of available player identification profiles via a profile entry box 404. Among the choices is a "Default" choice in which the video game assigns the player an anonymous identity to allow the player to play anonymously. The video game then automatically assigns the new player to an available character. Alternatively, the video game can present a second menu (not shown) to allow the player to select their desired character among those currently available or those that can be made available. Either player can then accept or cancel the join operation via actuation of the controller (e.g., via surface buttons 136(1) or 136(2)) associated with options "A" and "B" on the menu 402.

For purposes of continuing discussion, suppose the Flint character 308 is automatically selected for receiving direct commands from the new player. When multiple players participate, the screen is split to accommodate different viewing perspectives for the various players based upon their respective directly controlled characters. When the screen is split, the amount of viewing space available for each player is diminished.

Figure 5:
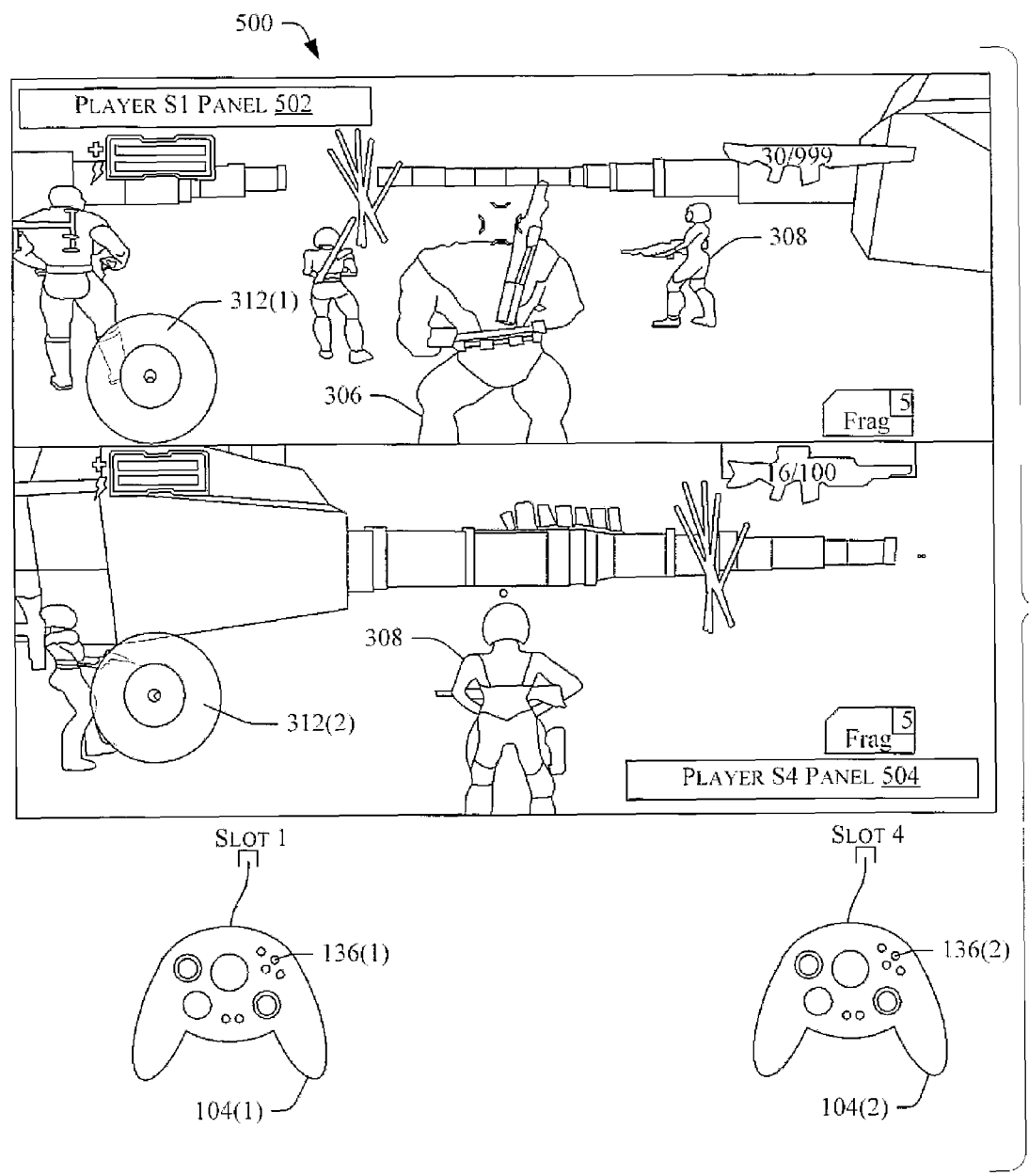
FIG. 5 illustrates an exemplary screen display for the environment described with respect to FIG. 3, where the screen display has a join menu overlaying a scene to indicate that a new player wishes to join one of the players in controlling the same squad or wishes to form a new squad to engage in competition against the other squads in game play that is in progress.

FIG. 5 shows a screen display 500 that is depicted in response to adding a second player. The screen display is split into two panels: an upper panel 502 and a lower panel 504. The upper panel 502 shows the combat action from the perspective of the character (i.e., the Brutus character 306) selected for direct control by the first player who is operating controller 104(1) in slot 1. The lower panel 504 shows the combat action from the perspective of the directly controlled character (i.e., the Flint character 308) selected by the second player who is operating controller 104(2) in slot 4. The two players control their respective squad members and work together to carry out the mission. The two remaining and unselected characters on the same squad—Tex and Hawk—are controlled by the AI of the video game using one-time commands that are occasionally given to Tex and Hawk by the first and second players.

With the reduced screen area for each player, the depicted control elements and visual presentation are chosen to offer a compelling gaming experience for all players. In the illustrated multiple player squad command mode, the squad status display is removed from each panel 502 and 504, leaving the radar displays 312(1) and 312(2). This leaves more screen area for other visual effects.

When there are fewer players assigned to a squad than there are members in the assigned squad, each player can select another squad character that is not currently selected by another player that is assigned to the same squad. The newly selected character is then directly controlled by this selection. For instance, the first player who is operating controller 104(1) in slot 1 can switch from the Brutus character 306 to the Hawk or Tex characters. Likewise, the second player who is operating controller 104(2) in slot 4 can switch from the Flint character 308 to the Hawk or Tex characters.

Additional players can continue to join. In the illustrated implementation, the game console 102 has four controller slots 110 (FIG. 1). Assuming two players are already playing, two additional players can join the game. In other implementations, however, the game console can be configured to support more or less than four players. As each player joins a game, the new player is granted control over a squad member and the screen further divides to provide a viewing panel from that squad member's perspective.

In the event that a new player does not wish to join an existing player in commanding the same squad, but would rather form a new squad of characters that will then engage in combat against all other squads that are then in play, an alternative menu (not shown) can be presented. The new player can be detected, and the alternative menu presented, when a new controller 104 is plugged into an open slot on the face of one of the current game consoles. The alternative menu can also be presented when a new game console in communication with the existing game consoles, where each game console is executing the same video game.

When a new player joins an existing squad or forms a new squad, a welcoming statement can be displayed and a menu can be displayed. The menu can offer the new player a choice of available squads and/or player identification profiles via a profile entry box. Default choices of squads and characters may also be assigned automatically to the joining player. In one implementation, any current player can accept or cancel the join operation being requested by the new player via actuation of their respective controllers. As such, the current players can decide whether or not to let the new squad into the combat.

When new players join a video game that is already being played on a game console, the screen is split to accommodate different viewing perspectives both for the current one or more players and for the new players. When the screen is split, the amount of viewing space available for each player is diminished. As such, other screen displays that are split in three and four ways are contemplated, where a respective third player and fourth player joins the game by connecting respective third and fourth controllers 104(3), 104(4) to slots 2, 3.

It is noted that the relationship of which screen panels are controlled by which controllers is merely representative. In one implementation, the game can be configured to associate particular screen panels with specific controller slots, but this need not be the case. Additionally, there is no particular order of slots for players to plug into as they join a game. For example, a single player could play his assigned squad against that of another player operating a different gaming system, where the controller of each player is inserted into any one of the four slots on their respective game consoles. A second player could later join by inserting his/her controller into any one of the remaining unused slots on any of the game consoles, and so on.

As noted earlier, depiction of the join menu 402 (FIG. 4) as each new player joins the game is optional. In another implementation, the video game can proceed directly to the split screen display without presenting the join menu 402. In this implementation, depending upon how the video game has been configured, the video game can automatically assign each joining player to an existing squad and a character therein or to a new squad and a character therein. The video game can automatically assigns a player profile identity to the new player and presents that character's perspective in a newly created screen panel. This allows the game to continue without any interruption that may be caused by the pop up menu 402 or by a menu that offers an option to form a new squad (not shown). In yet another implementation, the video game can present join menu 402 and then present another menu to allow the new player to select a desired character to directly control from among those currently available (not selected) or those that can be made available. In any event, regardless of whether a join menu is presented or whether there is an automatic the assignment of new squads and/or player identity profiles, the techniques described above allow new players to join an in-progress game without first having to save the game, return to a setup menu and re-specify the number of players, and then restart the game.

In the above example, there are four characters in a squad. When four players are assigned to the same squad, each player controls a squad character. In other implementations, there may be more or less than four squad characters. In the case where there are more players assigned to the same squad than there are available characters, the video game can generate and assign a generic fighter to the squad. This generic squad member does not have the specific personalities and special abilities associated with the predefined characters—Tex, Hawk, Flint, and Brutus—but can be selected for direct control by a player to function in the field of combat. As an example, suppose the video game console is configured to support six players and the video game has four predefined characters on the squad. When a fifth or sixth player joins the game in an assignment to same squad after all four main characters are assigned, the video game automatically generates or "spawns" a generic fighter for the direct control by the new player. The generic fighter is added to the squad and works together with the other squad members to accomplish a combat mission against squads controlled by other players.

If one of the players that directly controls one of the main characters subsequently leaves, thereby relinquishing control of one of the main character, the video game can replace the generic fighter with the vacated main character. Through the use of generic fighters, the size of the squad is expanded or contracted to satisfy the number of players that are assigned to the same squad.

Dynamic Joining Process

Figure 6:
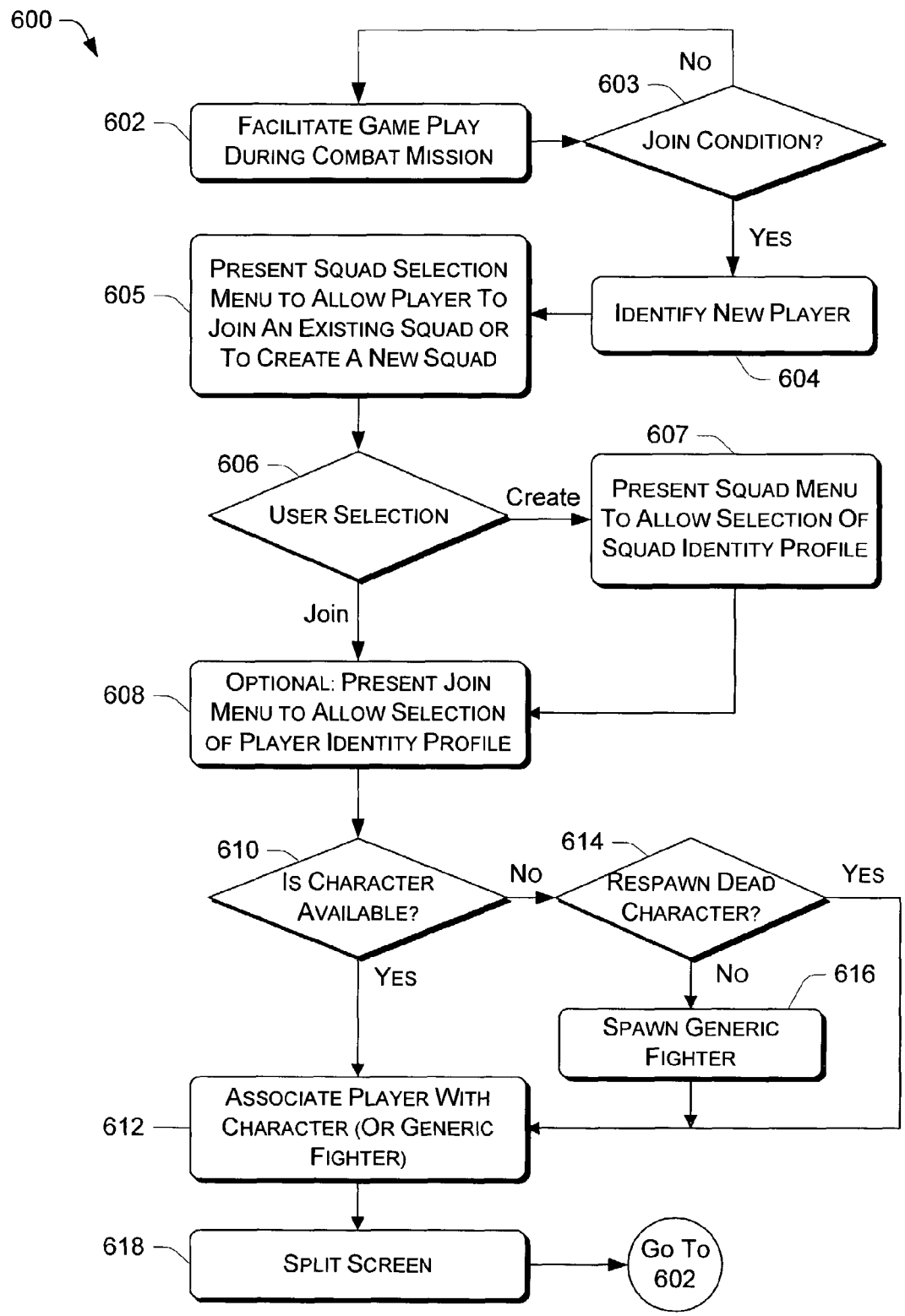
FIG. 6 is a flow diagram of an exemplary process for enabling additional players to dynamically join a game that is in progress.

FIG. 6 shows a process 600 for dynamically joining a new player to a current game that is in progress. The process 600 is illustrated as a series of blocks representing individual operations or acts performed by the gaming system of FIGS. 1-2 in response to executing the video game. The process 600 may be implemented in any suitable hardware, software, firmware, or combination thereof. In the case of software and firmware, process 600 represents a set of operations implemented as computer-executable instructions stored in memory and executable by one or more processors.

At block 602, the video game facilitates game play during which there is an ongoing a squad versus squad combat mission. The game is already in progress, and the existing two or more players are directly controlling respective characters of various squads in respective combat missions against the other squads. At block 603, the video game detects when another player has joined the in-progress game. In one implementation, a join condition is generated when a hardware interrupt condition occurs indicating that a new controller has been inserted into a vacant slot. In another implementation, a join condition is generated when a hardware interrupt condition occurs indicating that a game console playing the same video game has been placed into communication with the existing one or more game consoles. The video game continually polls for such hardware interrupts. In one implementation, the video game polls once every video frame.

When a join condition occurs (i.e., the "yes" branch from block 603), the video game identifies the new player associated with the newly attached game console and/or controller (block 604). Otherwise, process 600 returns to block 602. At block 604, the player identity (e.g., player in slot N) is stored in memory. At block 605, the video game optionally presents the join menu to enable the player to select an existing squad to join or to select the formation of a new squad. The user selection query is directed at block 606. If the player, or optionally one or more existing players, takes the option to form a new squad, the new squad and characters therein are formed at block 607 and process 600 proceeds to block 608. In an alternatively implementation, one or more existing players can respond to respectively displayed menus so that each existing player can either allow or disallow the new player to form a new squad. Based on a tie or majority vote of the existing players by their input in response to the menu, the new player may be able to form a new squad.

If the new player wants to join an existing squad, a selection to join one of the existing squads is recognized and process 600 proceeds to block 608. A representative join menu 402 is illustrated in FIG. 4, where a second player is about to join an existing player in the command of one of the squads.

At block 610, the video game determines whether a living character (or one that is optionally selected) is available to be directly commanded by the new character. If a character is available (i.e., the "yes" branch from block 610), the video game associates the character with the player identity profile (block 612). This can be done by correlating a character identity with the player identity profile in memory.

If no character is available (i.e., the "no" branch from block 610), the video game decides whether current game settings allow primary characters that have died in battle to be re-spawned (block 614). That is, one game setting allows characters who have been defeated in a mission to be given new life, or "re-spawned", with new health even though the mission is not over. If such a setting (i.e., the "yes" branch from block 610), the video game regenerates that character and assigns him to the new player (block 612). Otherwise, if all characters are taken and/or dead characters cannot be re-spawned (i.e., the "no" branch from block 610), the video game generates a generic fighter (block 616) and assigns that generic fighter to the new player (block 612).

At block 618, and only when then player is sharing a game console with another player, the video game splits the screen to provide a viewing panel for the new player. The new viewing panel offers the perspective of the combat from that of the new player's character. This is illustrated in the figures as the number of players increases from one player (FIG. 3) to two players (FIG. 5) using the game console, and can continue for three or more players (not shown). After the screen is split, the combat campaign continues at block 602 with a new set of players handling various ones of the squad members on their respectively assigned squads. The screen will not be split, the operation at block 618 will be moot, and process 600 will proceed to block 602 when the new player is not sharing a game console with another player, but has rather connected a new game console playing the video game so as to be in communication with the existing two or more game consoles.

Dynamic Leaving Process

The squad versus squad shooter video game further supports game continuity when one or more players, each being respectively assigned to one or more squads, leave a game that is in progress. Players can dynamically leave a game without having to halt and save the game, and then restart it following their departure.

Figure 7:
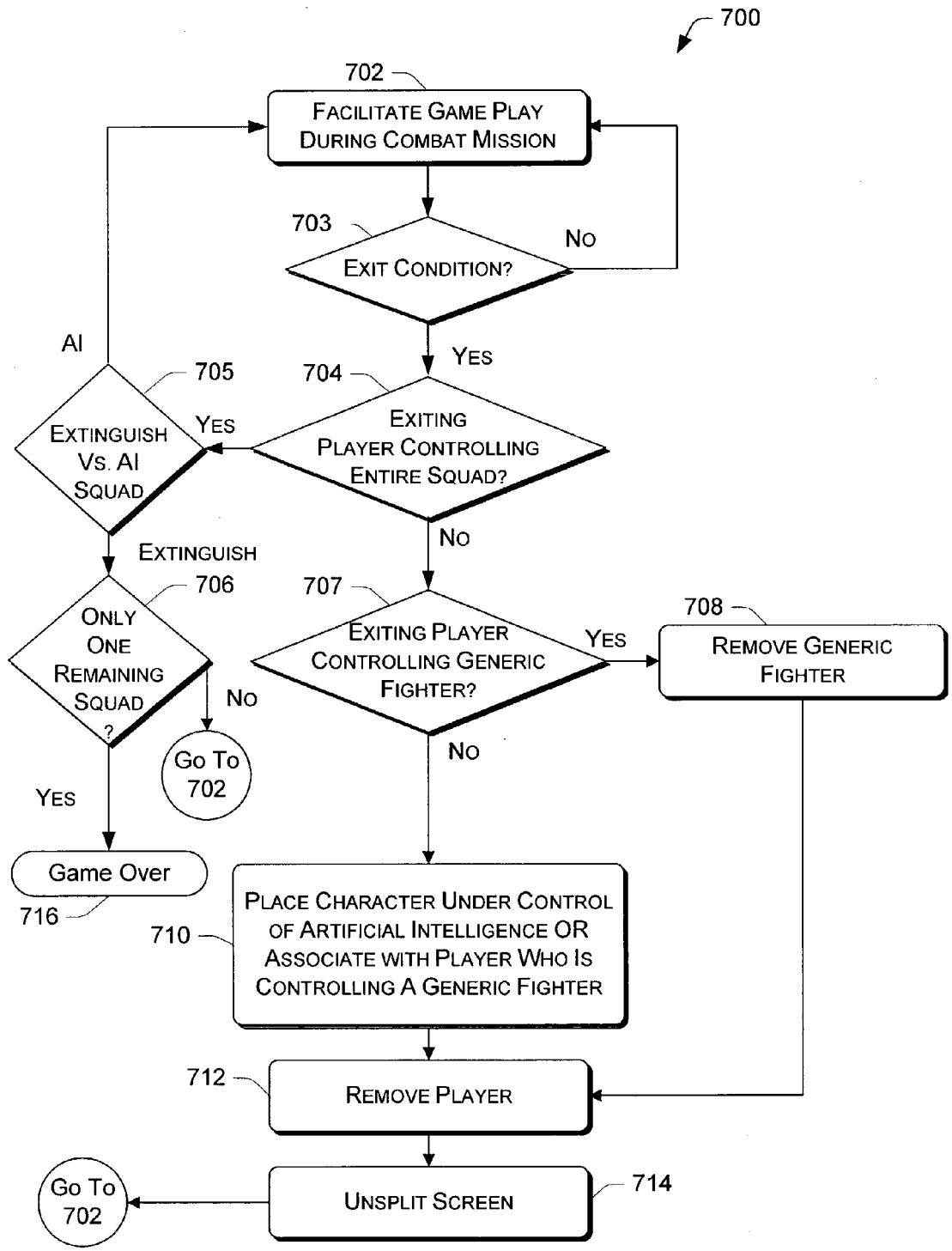
FIG. 7 is a flow diagram of an exemplary process for enabling existing players to dynamically leave the game while it is in progress.

FIG. 7 shows a process 700 for allowing one or multiple players to dynamically leave the game while it is in progress. The process 700 may be implemented in any suitable hardware, software, firmware, or combination thereof. In the case of software and firmware, process 700 represents a set of operations implemented as computer-executable instructions stored in memory and executable by one or more processors.

At block 702, a squad versus squad combat mission is in progress. The squad versus squad combat mission involves one or more players controlling a squad and its members to engage in combat against one or more other squads respectively being commanded by one or more other players. At block 703, the video game continually monitors for an exit condition. This condition may be triggered, for example, when a sole player of a video console disconnects the same from an established communication with other video consoles that are also playing the video game. The exit condition may also be triggered, for example, when a player disconnects his/her controller from a video console being shared to play the video game with other players. Either of these hardware detachments causes a hardware interrupt condition, which is detected by the video game being played by the one or more video consoles and is interpreted as a player leaving the game.

Upon detecting an exit condition (i.e., the "yes" condition from block 703), the video game determines whether the exiting player is controlling an entire squad on his/her own (block 704). If so, a determination is made at block 705 whether to extinguish the entire squad of the exiting player or allow artificial intelligence (AI) to take over control of the squad. If the decision is to keep the squad (i.e., the "AI" branch from block 705), the AI takes over command of the squad in the place of the exiting player and game play continues at block 702. Otherwise, if the squad is to be extinguished (i.e., the "Extinguish" branch from block 705), a decision is made as to whether extinguishing the squad would leave just one remaining squad (block 706). If so (i.e., the "Yes" branch from block 706), the squad versus squad game is effectively over (block 716) because there is just one squad remaining and it has no other human-controlled squad to compete against. If there are more than one squad remaining (i.e., the "No" branch from block 706), the exiting player's squad can be extinguished and process 700 can proceed to block 702 to continue combat between the remaining player-controlled squads. The remaining players can be prompted to make the foregoing determinations and/or the video game can be preconfigured to do so automatically.

When it is determined at block 704 that the exiting player is not the only player assigned to the squad, the video game determines whether the exiting player is controlling a generic fighter (block 707). If so (i.e., the "yes" branch from block 707), the video game removes the generic fighter from combat (block 708). On the other hand, if the exiting player is controlling a character (i.e., the "no" branch from block 707), the video game can either place the character back under the control of the AI or substitute the character for a generic fighter currently be controlled by another player (block 710). This latter option allows the player to control a predefined character, with a unique personality and special abilities, rather than a generic fighter. The substitution is performed by re-associating the character relinquished by the exiting player with the identity of the existing player who is controlling the generic fighter.

At block 712, the exiting player is removed and that player's identity is deleted from memory. The video game then updates the screen to remove the panel for the exiting player (block 714). Following block 714, process 700 can proceed to box 702 to continue combat between the remaining player-controlled squads.

CONCLUSION

The above-described squad versus squad shooter video game allows one or more players to control a squad in a combat mission against one or more other squads, each of which is similarly controlled by one or more other players. Player can dynamically join or leave a game in progress without having to save and restart the game. This allows continuous and uninterrupted play as players, and their assigned squads, come and go. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. For use with one or more console-based video game systems, a storage medium storing a squad-based shooter video game having instructions that, when executed on the one or more video game systems, cause the one or more console-based video game systems to perform acts comprising:

receiving input from one or more players via their respective use of controllers in communication with one or more console-based video game systems;

interpreting the input from each controller as a command to a squad in a competition against one or more other squads that are respectively commanded by one or more players via their respective use of controllers, wherein:

each squad includes a plurality of characters, the plurality of characters including a predetermined number of predefined characters;

input from each of the one or more players is assigned to one of the squads; and action of each character in the video game is a function of one or more commands given to that character by one of the one or more players;

while any player is actively commanding a squad, generating a join condition within the video game as a result of a new player connecting a game controller to the video game system running the squad-based shooter video game; and upon the new player joining the squad-based shooter video game, automatically generating a generic fighter to be directly controlled by the new player when it is determined that the predefined characters are being controlled by other players and when it is determined that dead predefined characters cannot be re-generated.

2. The storage medium as defined in claim 1, wherein the acts further comprise:
  detecting, while any player is actively commanding a squad within the squad-based shooter video game, an exit condition indicating that that one of the players is quitting play of the squad-based shooter video game; and
  upon detecting the exit condition:
    determining the existence of a first condition or a second condition, wherein:
      the first condition occurs, where the exiting player is the only player commanding the squad to which the exiting player is assigned; and
      the second condition occurs when the other input from the players are also assigned to command the squad to which the exiting player's input is assigned;
    if the existence of the first condition is determined, then determining if the assigned squad of the exiting player's input is to be:
      extinguished from the playing the squad-based shooter video game; or
      controlled by artificial intelligence (AI) rather than by any player;
    if the existence of the second condition is determined, then associating a character to which the exiting player's input was associated to another player's input that is assigned to the same squad as the exiting player; and
    eliminating a viewing panel of the exiting player.

3. The storage medium as defined in claim 2, wherein the exit condition is generated as a result of the exiting player disconnecting a game controller from a video game system running the squad-based shooter video game.

4. The storage medium as defined in claim 2, wherein the exit condition is generated as a result of the disconnection of a video game system running the squad-based shooter video game from another video game system running the squad-based shooter video game.

5. A storage medium as recited in claim 1, wherein each player can provide input via their respective controller to:
  directly command one character on their input's assigned squad; and
  indirectly command all of the characters on the their input's assigned squad that are not be directly commanded by another player, wherein any indirect command is interpreted by artificial intelligence (AI) to control any action of the indirectly commanded characters.

6. A storage medium as recited in claim 1, wherein each player can provide input via their respective controller to directly command one character on their input's assigned squad to engage in combat with a correspondingly directly commanded character of another squad.

7. A storage medium as recited in claim 6, wherein, during combat, each player can see a display that includes the directly commanded character of another squad.

8. A storage medium as recited in claim 1, wherein any action of any character in the video game is a function of input from one player via a respective controller.

9. A storage medium as recited in claim 1, wherein any action of any character in the video game is a function of a specific command individually given directly to the character by one player.

10. A storage medium as recited in claim 1, wherein each player's input:
  is assigned to one squad such that the player can control and give commands to the characters thereof;
  directly commands one character on their input's assigned squad and sees a display of a first or third person view corresponding to directly commanded character; and
  can give commands to any character of their input's assigned squad that is not being directly command another player.

11. A storage medium as recited in claim 10, wherein each player can provide input via their respective controller to enter into a player versus player mode during which their directly commanded character on their input's assigned squad engages in combat with the directly commanded character of another squad.

12. A storage medium as recited in claim 11, wherein during the player versus player mode, each player can see a viewing panel that includes a display of the directly commanded character of another squad.

13. A storage medium as recited in claim 10, wherein each player can provide input via their respective controller to enter into a player versus player mode during which each player can see the directly commanded character of another squad.

14. A storage medium as recited in claim 10, wherein each player can provide input via their respective controller to enter into a player versus AI mode during which their directly commanded character on their input's assigned squad engages in combat with one or more characters of another squad that are not being directly commanded.

15. A storage medium as recited in claim 14, wherein during the player versus AI mode, each player can see the one or more characters of another squad that are not being directly commanded.

16. A storage medium as recited in claim 10, wherein each player can provide input via their respective controller to enter into a player versus AI mode during which the player can see a display of one or more characters of another squad that are not being directly commanded.

17. A storage medium as recited in claim 10, wherein each player can provide command switching input via their respective controller so as to directly command another character on their input's assigned squad and see a display of a first or third person view corresponding thereto, wherein the another character was not being directly commanded by another player's input.

18. A storage medium as recited in claim 1, wherein each player can give simultaneous commands to a plurality of characters of their input's assigned squad.

19. A storage medium as recited in claim 1, wherein:
  each controller that is in communication with the one or more console-based video game systems comprises a unitary housing that includes one or more input mechanisms useable by one player to make input to the squad-based shooter video game being executed on the one or more video game systems; and
  the input mechanisms are selected from the group consisting of one or more joysticks, one or more surface buttons, one or more triggers, and a combination of the foregoing.

20. For use with one or more console-based video game systems, a storage medium storing a squad-based shooter video game having instructions that, when executed on the one or more video game systems, performs acts comprising:
  receiving input from one or more players via their respective use of controllers in communication with one or more console-based video game systems; and
  interpreting the input from each controller as a command to a squad in a competition against one or more other squads that are respectively commanded by one or more players via their respective use of controllers, wherein:
- each squad includes a plurality of characters, the plurality of characters including a predetermined number of predefined characters;
- input from each of the one or more players is assigned to one of the squads; and
- action of each character in the video game is a function of one or more commands given to that character by one of the one or more players;

detecting, while any player's input is actively commanding a squad in the squad-based shooter video game, a join condition indicating that a new player would like to join in playing the squad-based shooter video game; and upon detecting the join condition:
- determining whether the new player's input is to form a new squad or to control an existing member of an actively commanded squad, wherein each existing player can either allow or disallow the new player to form a new squad;
- providing a screen display such that each of the new player and the other players view action through different, respective viewing panels;
- facilitating play of the squad-based shooter video game by the new player and the other players with the respective squads that they command; and
- automatically generating a generic fighter to be directly controlled by the new player when it is determined that the predefined characters are being controlled by other players and when it is determined that dead predefined characters cannot be re-generated.

21. The storage medium as defined in claim 20, wherein the join condition is generated as a result of a video game system running the squad-based shooter video game being connected by the new player to another video game system running the squad-based shooter video game.

22. The storage medium as defined in claim 21, wherein the connection of the video game system to the another video game system is selected from the group consisting of:
- an electrical cable that is connected to each video game system; and
- a network with which each video game system is in communication.

23. The storage medium as defined in claim 20, wherein the acts further comprise, prior to the providing a screen display, presenting a join menu to indicate a new player is joining the game.

24. The storage medium as defined in claim 20, wherein the acts further comprise, when it is determined that the new player is to join an existing squad, associating a first character from one squad with the input from the one player and associating a second character of the one squad with the input from the new player such that each player controls one different character of the squad.

25. The storage medium as defined in claim 20, wherein the acts further comprise, when it is determined that the new player is to form a new squad, assigning one of the new squad of characters to the input from the new player.

26. A video game console system, comprising:
- means for executing a video game;
- means for receiving input from one or more players to the video game;
- means for interpreting the input as a respective command from a respective player;
- means for applying each command to a squad in a competition against one or more other squads that are respectively commanded by one or more players via their respective use of the means for receiving input, wherein:
  - each squad includes a plurality of characters, the plurality of characters including a predetermined number of predefined characters;
  - input from each of the plurality of players is assigned to one squad; and
  - action of each character in the video game is a function of a command given to that character by one player;
- means for generating a join condition as a result of a second video game console system running the video game being physically connected to a first video game console system running the video game using an electrical cable to make the physical connection, wherein the join condition is generated while input from a player is actively controlling at least one character of the one squad; and
- means for automatically generating a generic fighter to be directly controlled by a new player when it is determined that the predefined characters are being controlled by other players and when it is determined that dead predefined characters cannot be re-generated.

27. The video game console system as defined in claim 26, further comprising:
- means for detecting, while any player's input is actively controlling at least one character of one squad of the video game, a join condition indicating that a new player would like to join in playing the video game; and
- means, upon detecting the join condition, for:
  - determining whether input from the new player is to form a new squad or join an existing squad;
  - providing a screen display such that each of the new player and the other players view action through different, respective viewing panels; and
  - facilitating play of the video game by the new player and the other players with the respective squads that input commands.

28. The video game console system as defined in claim 27, wherein the join condition is generated as a result of the new player connecting a game controller to a video game system running the video game.

29. The video game console system as defined in claim 27, further comprising means, prior to the providing a screen display, for presenting a join menu to indicate a new player is joining the game.

30. The video game console system as defined in claim 27, further comprising means, when it is determined that the new player is to join an existing squad, for associating a first character from one squad with input from one player and associating a second character of the one squad with input from the new player such that each player's input controls one different character of the squad.

31. The video game console system as defined in claim 27, further comprising means, when it is determined that the new player is to form a new squad, for assigning of the new squad of characters to the input from the new player.

32. The video game console system as defined in claim 26, further comprising means for:
- detecting, while any player is playing the video game, an exit condition indicating that that one of the players is quitting play of the video game; and
- upon detecting the exit condition:
  - determining the existence of a first condition or a second condition, wherein:
    - the first condition occurs, where the exiting player is the only player commanding the squad to which the exiting player's input is assigned; and the second condition occurs when the other players' inputs are also assigned to command the squad to which the exiting player's input is assigned;

if the existence of the first condition is determined, then determining if the assigned squad of the exiting player's input is to be:

extinguished from the playing the video game; or controlled by artificial intelligence (AI) rather than by any player;

if the existence of the second condition is determined, then associating a character to which the exiting player's input was associated to another player's input that is assigned to the same squad as the exiting player; and eliminating a viewing panel of the exiting player.

33. The video game console system as defined in claim 32, wherein the exit condition is generated as a result of the exiting player disconnecting a game controller from a video game system running the video game.

34. The video game console system as defined in claim 32, wherein the exit condition is generated as a result of the disconnection of a video game system running the video game from another video game system running the video game.

35. A video game console system as recited in claim 26, wherein the means for interpreting and the means for applying comprise artificial intelligence (AI).

36. A video game console system as recited in claim 26, wherein each player can give simultaneous commands to a plurality of characters of their input's assigned squad.

* * * * *